US011824922B2

(12) United States Patent
Kurian et al.

(10) Patent No.: US 11,824,922 B2
(45) Date of Patent: *Nov. 21, 2023

(54) OPERATING CLOUD-MANAGED REMOTE EDGE SITES AT REDUCED DISK CAPACITY

(71) Applicant: MICROSOFT TECHNOLOGY LICENSING, LLC, Redmond, WA (US)

(72) Inventors: Alphonse Kurian, Bellevue, WA (US); Pushpraj Agrawal, Redmond, WA (US); Arpan Kumar Asthana, Bothell, WA (US); Chandrasekhar Pasupuleti, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,247

(22) Filed: Sep. 27, 2022

(65) Prior Publication Data

US 2023/0015635 A1 Jan. 19, 2023

Related U.S. Application Data

(63) Continuation of application No. 17/093,553, filed on Nov. 9, 2020, now Pat. No. 11,477,267.

(51) Int. Cl.
*G06F 15/16* (2006.01)
*H04L 67/10* (2022.01)
(Continued)

(52) U.S. Cl.
CPC .......... *H04L 67/10* (2013.01); *G06F 9/45558* (2013.01); *G06F 9/5072* (2013.01);
(Continued)

(58) Field of Classification Search
CPC ... G06F 9/5077; G06F 3/0653; H04L 41/0659
See application file for complete search history.

(56) References Cited

U.S. PATENT DOCUMENTS 8,683,260 B1 * 3/2014 Zhang ................. G06F 11/1092
714/13
8,984,243 B1 * 3/2015 Chen ..................... G06F 3/0631
711/E12.069

(Continued)

*Primary Examiner* — Hieu T Hoang
(74) *Attorney, Agent, or Firm* — Newport IP, LLC; Han K. Gim

(57) ABSTRACT

Health and usage data are monitored for storage devices of a remote computing environment that is remote from a computing service provider. The remote computing environment comprises a subset of computing systems of a computing service provider that manages the remote computing environment. Based on the monitored health data, it is determined that one of the storage devices has failed. In response, it is determined whether a computing device of the remote computing environment that is associated with the failed storage device should be marked unhealthy or continue to operate at a reduced capacity. When it is determined that the computing device associated with the failed storage device should continue to operate at a reduced capacity, the computing device is reprovisioned with available storage devices and the computing device is operated at the reduced capacity.

20 Claims, 10 Drawing Sheets

(51) Int. Cl.
*G06F 9/455* (2018.01)
*G06F 9/50* (2006.01)
*H04L 41/0659* (2022.01)
*H04L 41/50* (2022.01)
*H04L 67/1097* (2022.01)

(52) U.S. Cl.
CPC .......... *G06F 9/5077* (2013.01); *G06F 9/5083* (2013.01); *H04L 41/0659* (2013.01); *H04L 41/5096* (2013.01); *H04L 67/1097* (2013.01)

(56) References Cited

U.S. PATENT DOCUMENTS

| | | | | |
|---|---|---|---|---|
| 9,582,220 | B2* | 2/2017 | Samuels | G06F 12/0246 |
| 9,641,615 | B1* | 5/2017 | Robins | G06F 3/0604 |
| 10,282,231 | B1* | 5/2019 | Sivasubramanian | G06F 11/3442 |
| 10,592,111 | B1* | 3/2020 | Wang | G06F 3/0619 |
| 11,023,318 | B1* | 6/2021 | Volkov | G06F 16/1805 |
| 2003/0212931 | A1* | 11/2003 | Hetrick | G06F 11/1092 |
| | | | | 714/710 |
| 2004/0243692 | A1* | 12/2004 | Arnold | G06F 9/5016 |
| | | | | 711/170 |
| 2010/0192156 | A1* | 7/2010 | Hollingsworth | G06F 9/5011 |
| | | | | 718/104 |
| 2014/0130055 | A1* | 5/2014 | Guha | G06F 9/5011 |
| | | | | 718/104 |
| 2016/0062699 | A1* | 3/2016 | Samuels | G06F 3/0619 |
| | | | | 711/103 |
| 2017/0034271 | A1* | 2/2017 | Baptist | G06F 3/0604 |
| 2017/0315891 | A1* | 11/2017 | Park | G11C 29/88 |
| 2017/0324813 | A1* | 11/2017 | Jain | H04L 41/5009 |
| 2019/0129797 | A1* | 5/2019 | Ma | G06F 12/0246 |
| 2019/0235956 | A1* | 8/2019 | Liu | G06F 11/1004 |
| 2019/0238432 | A1* | 8/2019 | Parag | H04L 67/1097 |
| 2020/0167251 | A1* | 5/2020 | Gao | G06F 11/2094 |
| 2020/0174900 | A1* | 6/2020 | Cagno | G06F 11/1092 |
| 2020/0327014 | A1* | 10/2020 | Creed | G06F 11/1092 |
| 2022/0121532 | A1* | 4/2022 | Vandrovec | G06F 11/2028 |

* cited by examiner

OPERATING CLOUD-MANAGED REMOTE EDGE SITES AT REDUCED DISK CAPACITY

PRIORITY APPLICATION

This application is a continuation of U.S. patent application Ser. No. 17/093,553 filed Nov. 9, 2020, the content of which is hereby expressly incorporated by reference in its entirety.

BACKGROUND

A data center may house computer systems and various networking, storage, and other related components. Data centers may, for example, be used by service providers to provide computing services to businesses and individuals as a remote computing service or provide "software as a service" (e.g., cloud computing). Service providers may also utilize edge sites that may include a geographically distributed group of servers and other devices that work together to provide efficient delivery of content to end-users of data center services, with the goal being to provide services with high availability and improved latencies. It is with respect to these considerations and others that the disclosure made herein is presented.

SUMMARY

In various embodiments, users of a computing service such as a cloud computing service may be provided use of such services via computing and storage resources of the computing service at a remote location ("edge site"). The users may continue to benefit from the computing services, while aspects of the services are incorporated into the edge sites. Edge sites enable a data center to extend cloud services to local deployments using a distributed architecture that enables federated options for local and remote data and control management.

It is desirable to provide the highest level of computing availability at an edge site while at the same time providing performance and minimizing cost. However, hardware failures at the edge sites cannot be addressed as they would at the data center. For example, when a disk fails at the data center, the impact of the failure on a server node of the data center can be minimized due to the spare capacity that is typically available at the data center. However, at an edge site, such failures can have a more significant capacity impact where such failures cannot be quickly addressed by service personnel.

The present disclosure provides an architecture that enables a data plane server with a disk (or other storage device) error to operate at reduced capacity until the disk can be serviced. Allowing the server nodes to continue operating at reduced capacity instead of marking the entire server as unhealthy can improve capacity availability at edge sites and enable the data center service provider to pool edge site issues to lower the time and cost of maintenance. The architecture distributes functions that are allocated locally and those that are allocated to the data center control plane, based on enabling the edge site to continue operations while tolerating hardware faults.

In an embodiment, data plane servers at the edge site may be configured to execute a disk monitoring agent that monitors the health of disks allocated to a server. The disk monitoring agent maintains data pertaining to the number of disks and their properties, and monitors various metrics including availability, read and write latency, and self-test results. The health status of all disks is sent to an edge capacity orchestrator that, in one embodiment, runs in the control plane at the data center.

The data plane servers may further execute a hardware manager agent that executes operations received from a hardware manager running in the control plane. The hardware manager agent creates/deletes partitions on disks to remove unhealthy disks or to add healthy disks as they are repaired or replaced. An edge capacity orchestrator receives health information for disks in the data plane servers at the edge site and determines whether a server has a disk failure, whether the server is to be marked unhealthy, or whether the server should be reprovisioned with available disks and run at a reduced capacity. The control plane also executes an allocation manager configured to select a server for deploying workloads (virtual machines, containers, etc.) at the edge site.

An allocation manager maintains a list of nodes (e.g., servers) at the edge site, their capabilities, and current workloads. The capabilities are modified when a disk error is detected and the edge capacity orchestrator determines that a node should run at reduced capacity. The hardware manager provisions the nodes to operate at a specified capacity based on the node's hardware configurations and workload requirements.

The described techniques can allow for a data center to provide localized and distributed nodes for providing user computing resources while maintaining efficient use of computing capacity such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
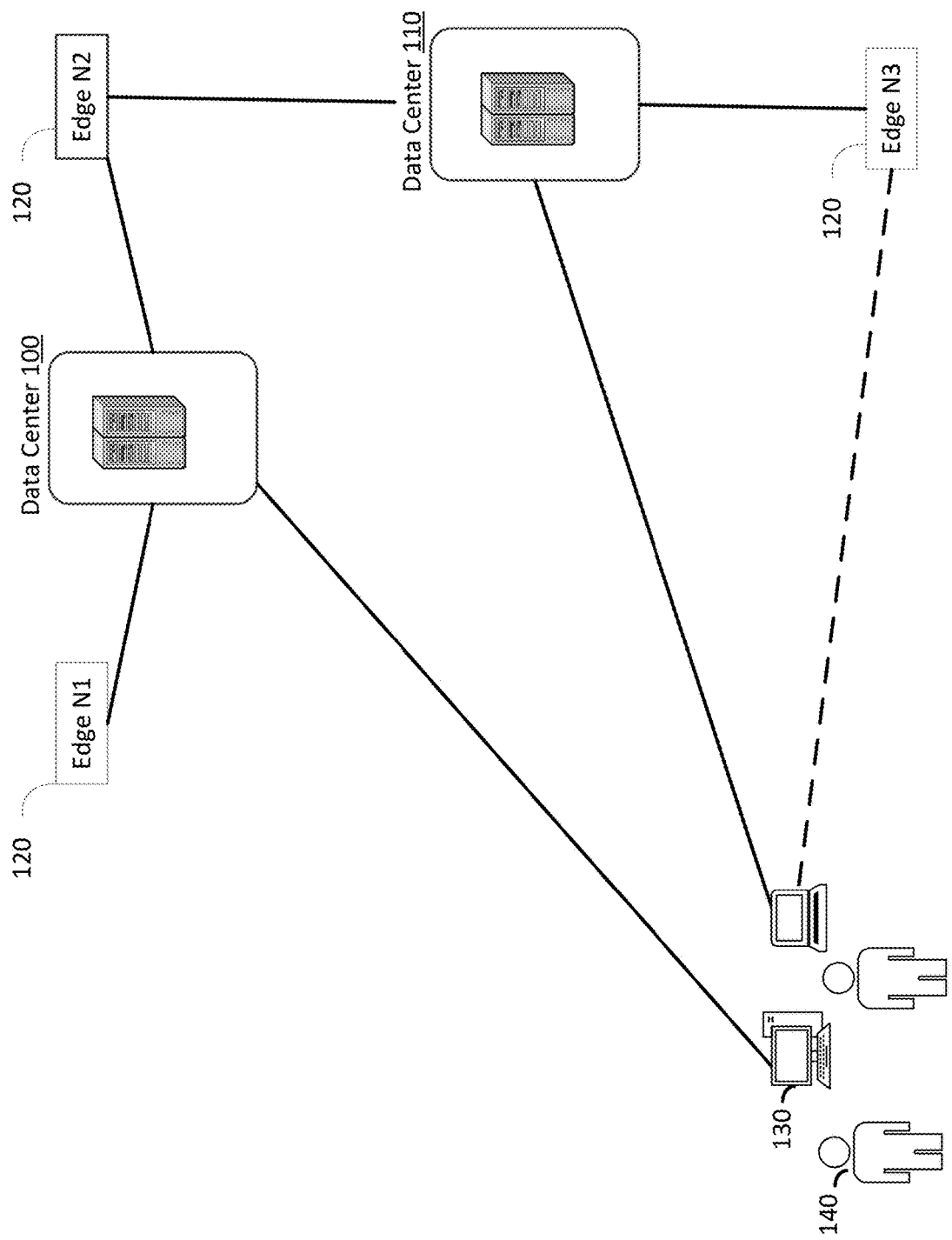
FIG. 1 is a diagram illustrating an example architecture in accordance with the present disclosure.

In some computing environments that provide virtualized computing and storage services, various computing and network services may be configured to enable the service provider to deploy their footprints closer to the user's premises, thereby extending the reach of the computing and network services closer to the user premises. For example, an enterprise that provides network carrier services may want computing services located closer to their networks or their customers, or a manufacturer may want to deploy computing resources closer to their facilities. Users of virtualized computing resources may benefit in many ways by deploying resources such as virtual machines on resources that are located closer to their premises. Additionally, localization of computing and storage devices may enable some users to more effectively meet data residency, compliance, latency, and other requirements, while continuing to benefit from many of the advantages of utilizing remote and/or virtualized computing services, such as scalability and flexibility.

Efficient management of the end-to-end capability services by the service provider can enable an experience that is seamless and consistent when using edge sites. The integration of local and remote resources with a comprehensive remote resource management approach can minimize the overhead for the service provider by maximizing the capabilities of the edge site. The effective distribution of the management functions can be determined based on the implications for various performance and security implications such as latency and data security.

Disk (or other storage device) failure is one type of failure that can cause a node (e.g., server) to fail. Disk failures can typically be addressed efficiently in larger data centers that may have spare capacity and have ready access to spare parts. Data centers may also have service personnel on site who can swap out the failed disk and get the servers back online. However, in an edge site scenario, data plane servers may be deployed in remote locations where the above-mentioned capabilities are not typically available. Lack of these capabilities along with the low capacity footprint of many edge sites mean that it is important to reduce server downtime and capacity loss.

Various embodiments disclosed herein describe techniques for running a data plane node that can operate at a reduced capacity in response to a storage device error. The data plane node can operate at a reduced capacity until the node can be accessed for service or replacement. Running these nodes at a reduced capacity instead of marking the entire node unhealthy can provide higher capacity availability in edge sites and provide a more flexible timeframe to pool and perform multiple repairs in an edge site, thus allowing for greater efficiencies in maintaining the edge sites. In some embodiments, edge data plane nodes with storage device failures may operate at a reduced capacity instead of marking them unhealthy and non-usable if there are minimum number of storage devices are available.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples. While many examples are described using servers and disks, it should be understood that other types of compute nodes and storage devices may be used in other embodiments.

FIG. 1 illustrates one example where users of a data center in accordance with some embodiments. FIG. 1 illustrates data center 100 and 110 that are configured to provide computing resources to users 140 via user computers 130. The computing resources provided by data centers 100 and 110 may be cached or replicated at edge nodes 120. The computing resources provided by the data centers 100 and 110 and edge nodes 120 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

It should be appreciated that although the embodiments disclosed above are discussed in the context of virtual machines, other types of implementations can be utilized with the concepts and technologies disclosed herein. It should be also appreciated that the network topology illustrated in FIG. 1A has been greatly simplified and that many more networks and networking devices may be utilized to interconnect the various computing systems disclosed herein. These network topologies and devices should be apparent to those skilled in the art.

Figure 2A:
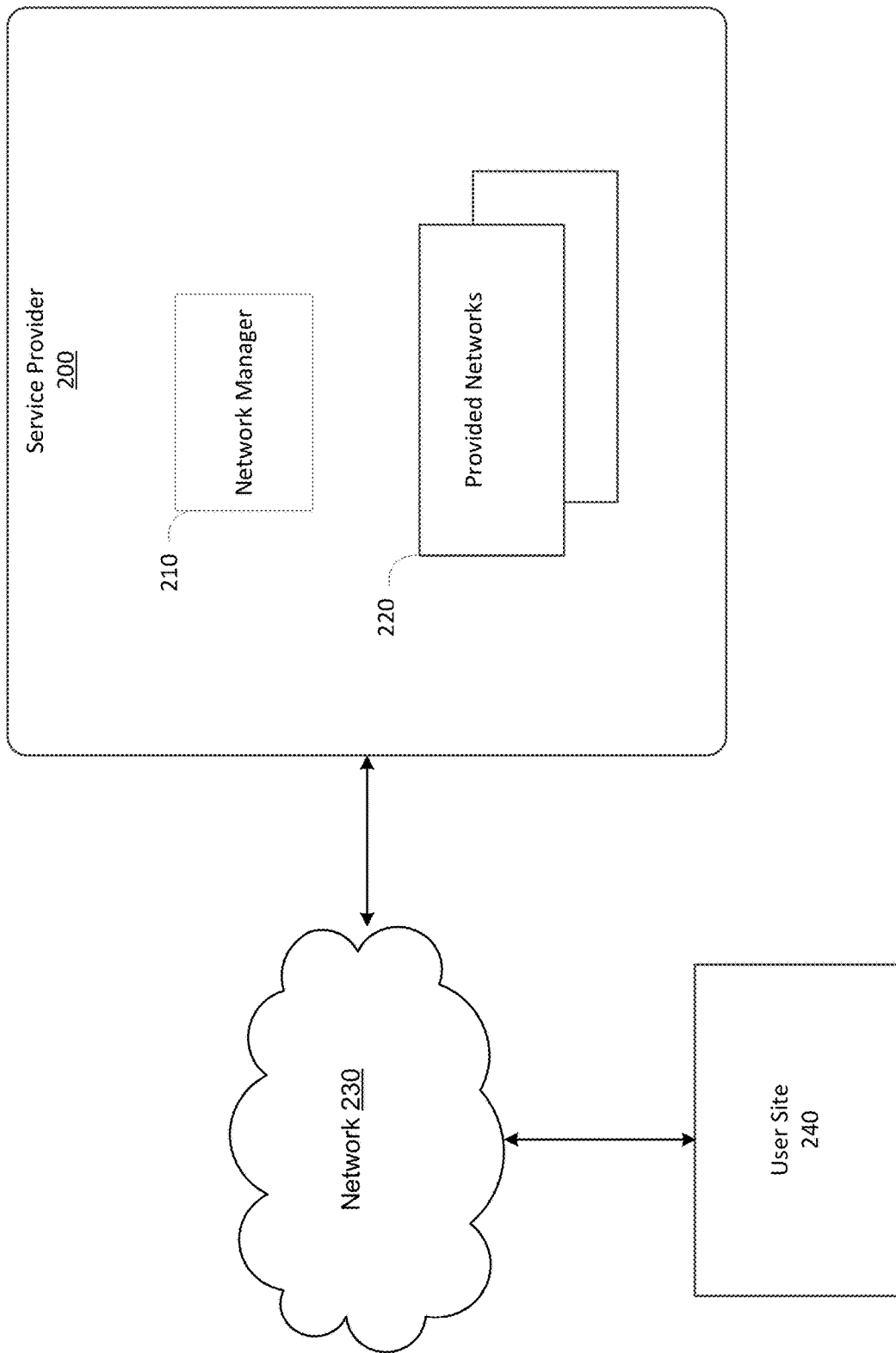
FIG. 2A is a diagram illustrating an example architecture in accordance with the present disclosure.

FIG. 2A illustrates an example computing environment in which the embodiments described herein may be implemented. FIG. 2A illustrates a service provider 200 that is configured to provide computing resources to users at user site 240. The user site 240 may have user computers that may access services provided by service provider 200 via a network 230. The computing resources provided by the service provider 200 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 200 may have various computing resources including servers, routers, and other devices that may provide remotely accessible computing and network resources using, for example, virtual machines. Other resources that may be provided include data storage resources. Service provider 200 may also execute functions that manage and control allocation of network resources, such as a network manager 220.

Network 230 may, for example, be a publicly accessible network of linked networks and may be operated by various entities, such as the Internet. In other embodiments, network 230 may be a private network, such as a dedicated network that is wholly or partially inaccessible to the public. Network 230 may provide access to computers and other devices at the user site 240.

Figure 2B:
FIG. 2B is a diagram illustrating an example architecture in accordance with the present disclosure.

FIG. 2B illustrates an example computing environment in which the embodiments described herein may be implemented. FIG. 2B illustrates that an edge site 250 may be implemented to extend the physical reach of service provider 200 to provide localized computing resources to users at user site 240 using provided networks 260. The computing resources provided by the edge site 250 may include some or all of the various types of resources provided by service provider 200. The resources at edge site 250 may be under the control of service provider 200.

Figure 3:
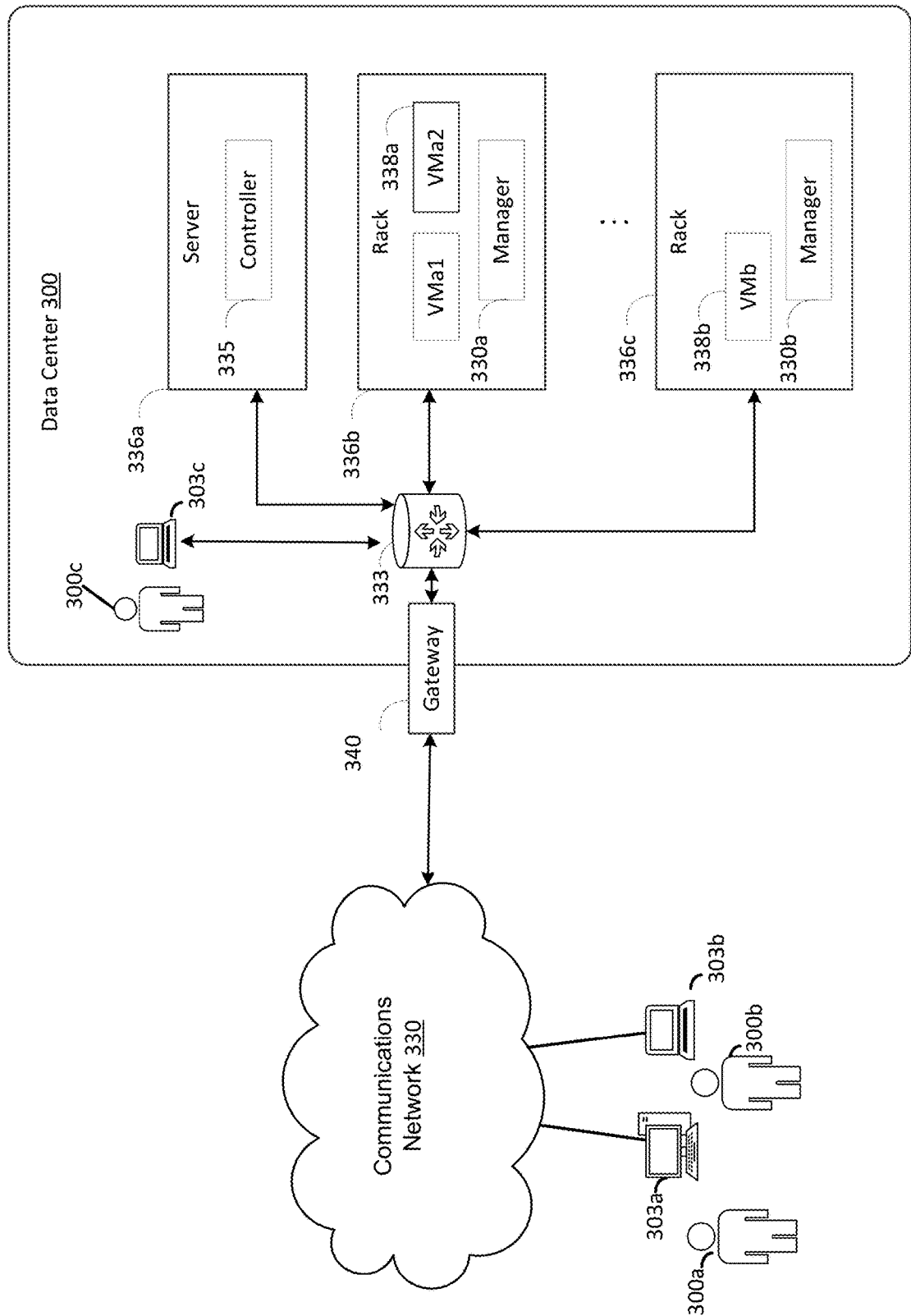
FIG. 3 is a diagram illustrating a data center in accordance with the present disclosure.

FIG. 3 illustrates an example computing environment in which the embodiments described herein may be implemented. FIG. 3 illustrates a data center 300 that is configured to provide computing resources to users 300a, 300b, or 300c (which may be referred herein singularly as "a user 300" or in the plural as "the users 300") via user computers 303a, 303b, and 303c (which may be referred herein singularly as "a computer 303" or in the plural as "the computers 303") via a communications network 330. The computing resources provided by the data center 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 300 may correspond to data center 100 and 110 of FIG. 1 or service provider 200 in FIGS. 2A and 2B. Data center 300 may include servers 336a, 336b, and 336c (which may be referred to herein singularly as "a server 336" or in the plural as "the servers 336") that may be standalone or installed in server racks, and provide computing resources available as virtual machines 338a and 338b (which may be referred to herein singularly as "a virtual machine 338" or in the plural as "the virtual machines 338"). The virtual machines 338 may be configured to execute applications such as Web servers, application servers, media servers, database servers, and the like. Other resources that may be provided include data storage resources (not shown on FIG. 3) and may include file storage devices, block storage devices, and the like. Servers 336 may also execute functions that manage and control allocation of resources in the data center, such as a controller 335. Controller 335 may be a fabric controller or another type of program configured to manage the allocation of virtual machines on servers 336.

Referring to FIG. 3, communications network 330 may, for example, be a publicly accessible network of linked networks and may be operated by various entities, such as the Internet. In other embodiments, communications network 330 may be a private network, such as a corporate network that is wholly or partially inaccessible to the public.

Communications network 330 may provide access to computers 303. Computers 303 may be computers utilized by users 300. Computer 303a, 303b or 303c may be a server, a desktop or laptop personal computer, a tablet computer, a smartphone, a set-top box, or any other computing device capable of accessing data center 300. User computer 303a or 303b may connect directly to the Internet (e.g., via a cable modem). User computer 303c may be internal to the data center 300 and may connect directly to the resources in the data center 300 via internal networks. Although only three user computers 303a, 303b, and 303c are depicted, it should be appreciated that there may be multiple user computers.

Computers 303 may also be utilized to configure aspects of the computing resources provided by data center 300. For example, data center 300 may provide a Web interface through which aspects of its operation may be configured through the use of a Web browser application program executing on user computer 303. Alternatively, a stand-alone application program executing on user computer 303 may be used to access an application programming interface (API) exposed by data center 300 for performing the configuration operations.

Servers 336 may be configured to provide the computing resources described above. One or more of the servers 336 may be configured to execute a manager 330a or 330b (which may be referred herein singularly as "a manager 330" or in the plural as "the managers 330") configured to execute the virtual machines. The managers 330 may be a virtual machine monitor (VMM), fabric controller, or another type of program configured to enable the execution of virtual machines 338 on servers 336, for example.

It should be appreciated that although the embodiments disclosed above are discussed in the context of virtual machines, other types of implementations can be utilized with the concepts and technologies disclosed herein.

In the example data center 300 shown in FIG. 3, a network device 333 may be utilized to interconnect the servers 336a and 336b. Network device 333 may comprise one or more switches, routers, or other network devices. Network device 333 may also be connected to gateway 340, which is connected to communications network 330. Network device 333 may facilitate communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
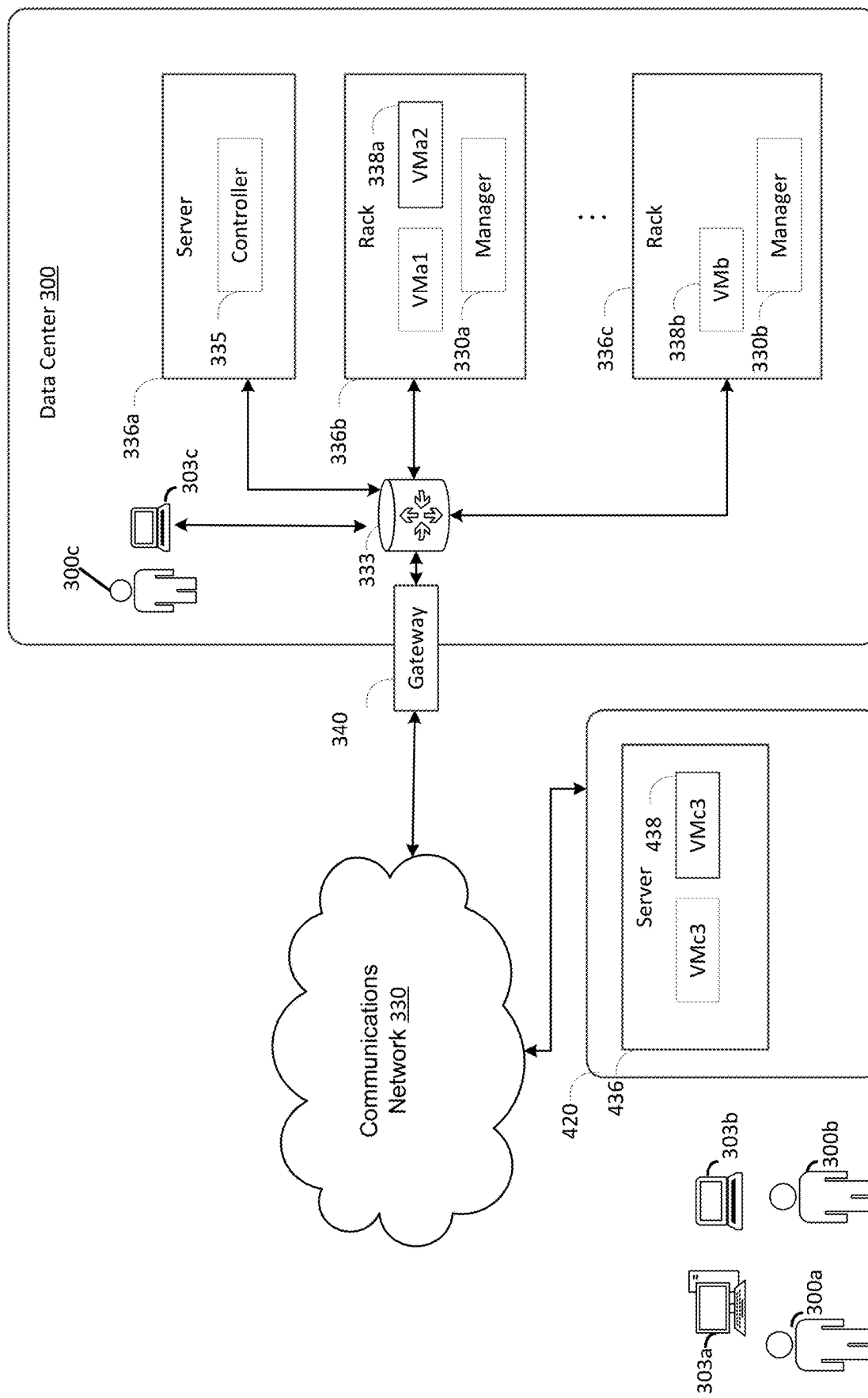
FIG. 4 is a diagram illustrating a data center and local resources in accordance with the present disclosure.

FIG. 4 illustrates an example computing environment illustrating integration of computing resources that include an edge site 420 that is geographically proximate to a facility local to users 300, in accordance with the present disclosure. In one embodiment, one or more servers 436 may be installed at the edge site 420. In an embodiment, servers 436 instantiate and run virtual machines 438.

In some embodiments, users 300 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Figure 5:
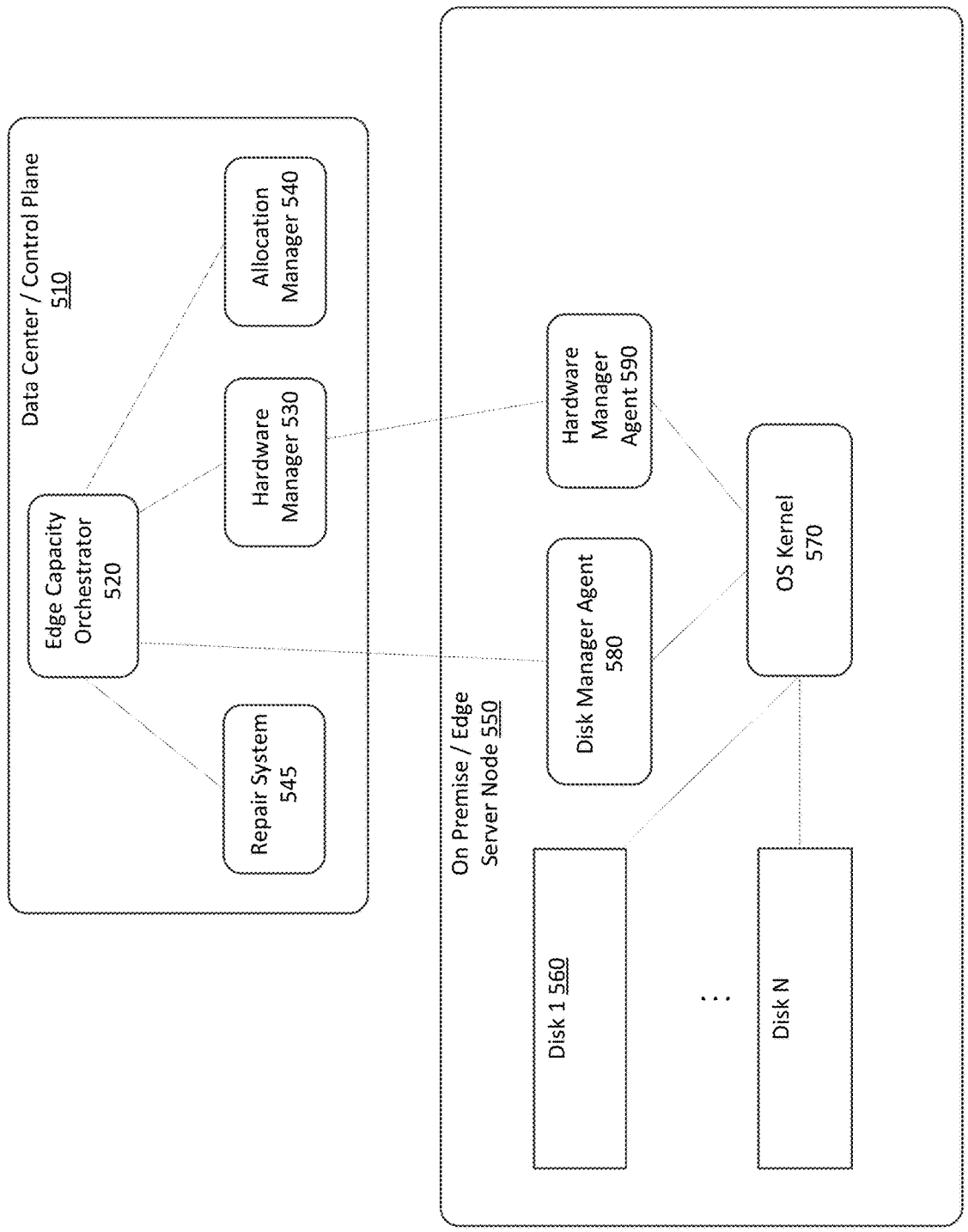
FIG. 5 is a diagram illustrating an architecture for implementing resource management in accordance with the present disclosure.

With reference to FIG. 5, illustrated is one example architecture for providing management of computing resources in accordance with the present disclosure. In an embodiment, the architecture may include a server node 550 that may include one or more disks 560. Disks 560 may be HDDs, SSDs, NVME, or other suitable technologies. The server node 550 may include operating system kernel 565. Operating system kernel 565 may be part of the operating system that has access to underlying hardware. Various hardware operations including reading the state of disks, formatting disks, assigning partitions, etc. may be performed by the OS kernel 565. Other components may interact with OS kernel 565 via APIs that are operable to receive requests to perform these operations.

Disk manager agent 580 may be a service running on the edge site server node 550 and configured to monitor the health of disks in the server node. The disk manager agent 580 may be configured to track the number of disks and their properties and monitor various metrics including availability, read and write latency, SMART test results, etc. The health status of all disks may be sent to edge capacity orchestrator 520 for performing actions as needed.

Hardware manager agent 590 may be executed as a service running on the edge server node 550. Hardware manager agent 590 may be configured to receive requests for operations from hardware manager 530 at the data center 510. The hardware manager agent 590 may perform the requested operations at the edge server node 550. In an embodiment, in response to receiving a request from hardware manager 530, the hardware manager agent 590 may recreate partitions on disks 560 to exclude unhealthy disks. When the unhealthy disks are repaired or replaced, the hardware manager agent 590 may repartition the server node to include the repaired or new disks.

The edge capacity orchestrator 520 may be located in the data center/control plane 510. The edge capacity orchestrator 520 may be configured to receive health information of disks in servers in an edge site. The health information data may be used to determine whether a server has a disk failure. If a failure is detected, edge capacity orchestrator 520 may determine whether the server node should be marked as unhealthy or whether the server node should be reprovisioned with available disks and run at a reduced capacity until the failed disk can be serviced.

Allocation manager 540 may be configured to determine a suitable node for deploying a given workload (e.g., virtual machines, containers, etc.). The allocation manager 540 may further be configured to maintain a list of all nodes at an edge site, their capabilities, and what workloads are currently running on each server node. The capability list may be modified when a disk error has been detected. The edge capacity orchestrator 520 may determine if the server node should continue operation with a lesser number of disks. After a failed disk is serviced, the allocation manager 540 may update the capability list.

Hardware manager 530 may be a control plane component that is configured to provision the server node to its goal state based on the server node's hardware configurations and workload requirements. When the edge capacity orchestrator 520 needs to partition a server node to exclude faulty disks, the edge capacity orchestrator 520 may communicate this information to the hardware manager 530. The hardware manager 530 may configure the server node to this state. When a failed disk is serviced, the edge capacity orchestrator 520 may communicate with the hardware manager 530 to include the serviced disks in a re-partition.

In some embodiments, a repair system 545 may be implemented which may be a ticketing system for hardware repairs for edge sites. The repair system 545 may be configured to maintain information about required service actions, type of repairs, criticality, etc. The edge capacity orchestrator 520 may generate a request to repair system 545 for a disk maintenance action when a disk failure is detected.

In one illustrative example of the described techniques, disk manager agent 580 may be implemented on each server node 550 of an edge site and continuously monitor disk health for the nodes. The disk manager agent 580 may send disk health data to the edge capacity orchestrator 520. When a disk failure is detected, the edge capacity orchestrator 520 may identify which disk is failing. If the failing disk is the OS disk, the edge capacity orchestrator 520 may send a request to the hardware manager 530 to assign another healthy disk as the OS disk. The edge capacity orchestrator 520 may then send a request to the hardware manager 530 to reprovision the server node to exclude the faulty disk. The reduction in capacity may be reported to the allocation manager 540. A repair request may be sent to the repair system 545 so that a maintenance action can be scheduled. The disk failure information may be added to a repair request list for tracking the repair status.

Figure 6:
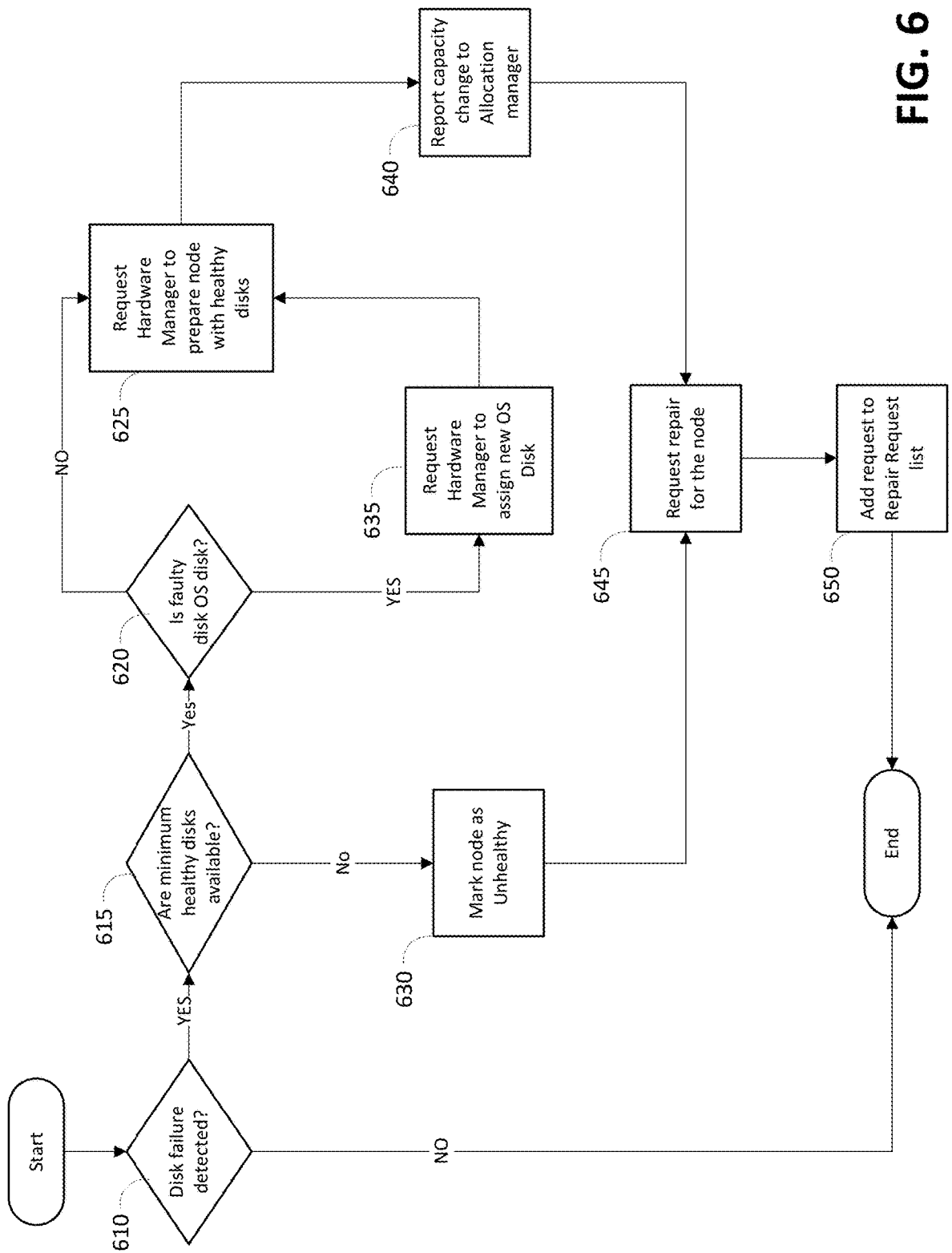
FIG. 6 is a flow diagram for implementing resource management in accordance with the present disclosure.
Figure 7:
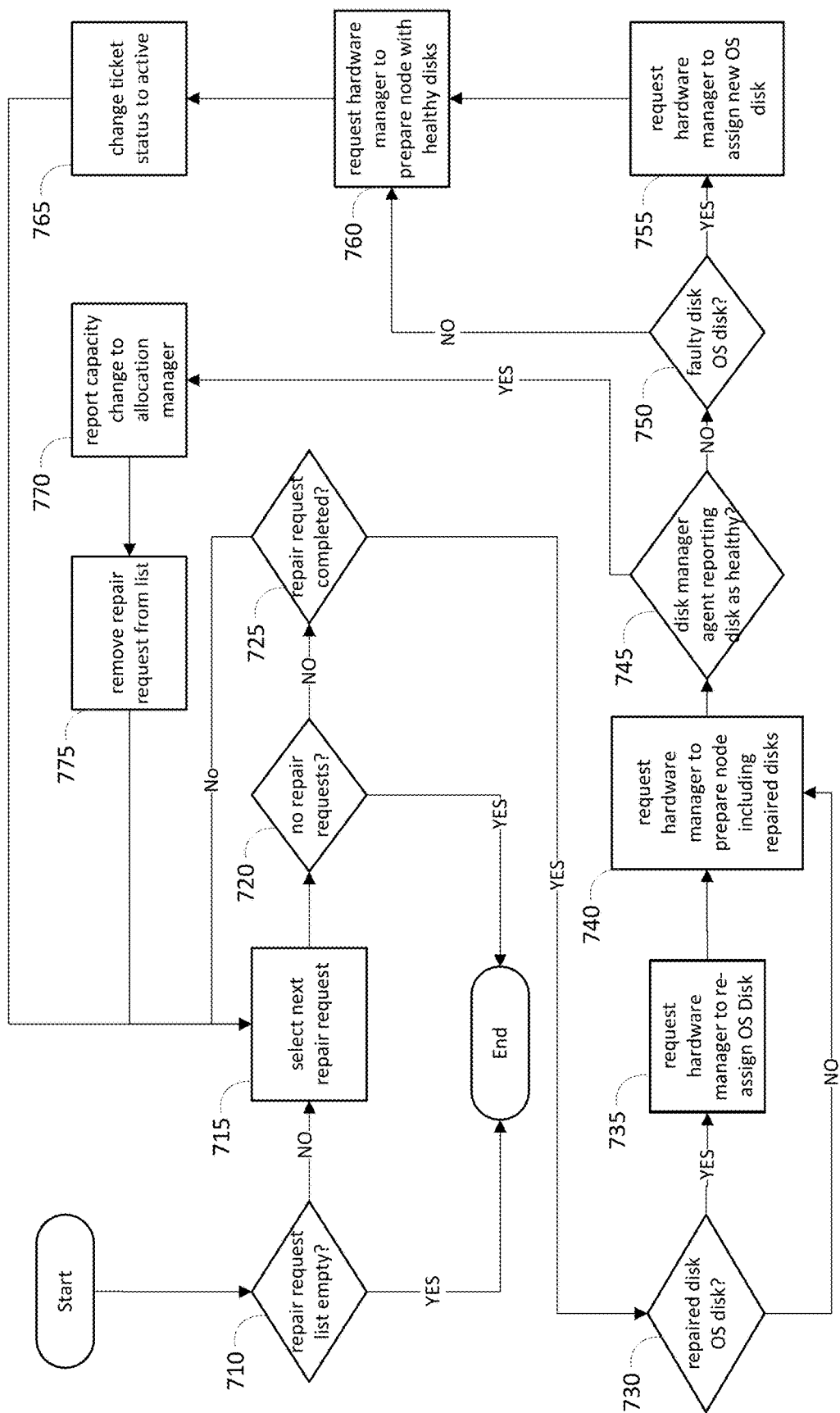
FIG. 7 is a flow diagram for implementing resource management in accordance with the present disclosure.

FIG. 6 illustrates an example of a control flow for a faulty disk, where a faulty disk is replaced. FIG. 7 illustrates an example control flow where a repair request is completed.

In one embodiment, the edge capacity orchestrator may periodically poll the repair system for the status of all submitted requests. For any request whose status is completed, the edge capacity orchestrator may send a request to the hardware manager to reprovision the node to include the repaired disk. If the repaired disk was originally an OS disk, the edge capacity orchestrator may send a request to the hardware manager to reassign this disk as the OS disk. Once reprovisioning is complete, the edge capacity orchestrator may wait for the disk manager agent to report the health of the disk. If the disk is reported as healthy, then the edge capacity orchestrator may report the increase in the node's capacity to the allocation manager and remove ticket information from its list of active tickets.

If the disk health is reported as unhealthy, then the edge site allocation manager may send a request to the hardware manager to reprovision the node without the repaired disk. If the repaired disk was an OS disk, the edge capacity orchestrator may send a request to assign another healthy disk as the OS disk. The status of the repair request may be updated to Active.

Turning to FIG. 6, if a disk failure is detected 610, then it is determined if a minimum number of healthy disks are available 615. If a minimum number of healthy disks is available, then it is determined if the faulty disk is an OS disk 620. If the faulty disk is an OS disk, then at operation 625, the hardware manager is requested to repair the node with healthy disks. At operation 640, the capacity change is reported to the allocation manager.

If the faulty disk is not an OS disk, then at operation 635 the hardware manager is requested to assign a new OS disk. If a minimum number of healthy disks is not available, then at operation 630, the node is marked as unhealthy.

At operation 645, a repair is requested for the node. At operation 650, the repair request is added to the repair request list.

Turning to FIG. 7, at operation 710, it is determined if the repair request list is empty. If the repair request list is not empty, then at operation 715, the next repair request us selected. At operation 720, it is determined that there are no further repair requests. If it is determined that there are further repair requests, then at operation 730, it is determined if the repaired disk is an OS disk. If the repaired disk is an OS disk, then at operation 735, the hardware manager is requested to reassign the OS disk. At operation 740, the hardware manager is requested to prepare the node including the repaired disks.

At operation 745, it is determined if the disk manager agent is reporting the disk as healthy. If it is determined that the disk manager agent is not reporting the disk as healthy, then at operation 750, it is determined if the faulty disk is an OS disk. If the faulty disk is an OS disk, then at operation 755, the hardware manager is requested to assign a new OS disk. At operation 760, the hardware manager is requested to prepare the node with healthy disks. At operation 765, the ticket status for the node is changed to active.

If it is determined that the disk manager agent is reporting the disk as healthy, then at operation 770, the capacity change is reported to the allocation manager. At operation 775, the repair request is removed from the repair request list.

Figure 8:
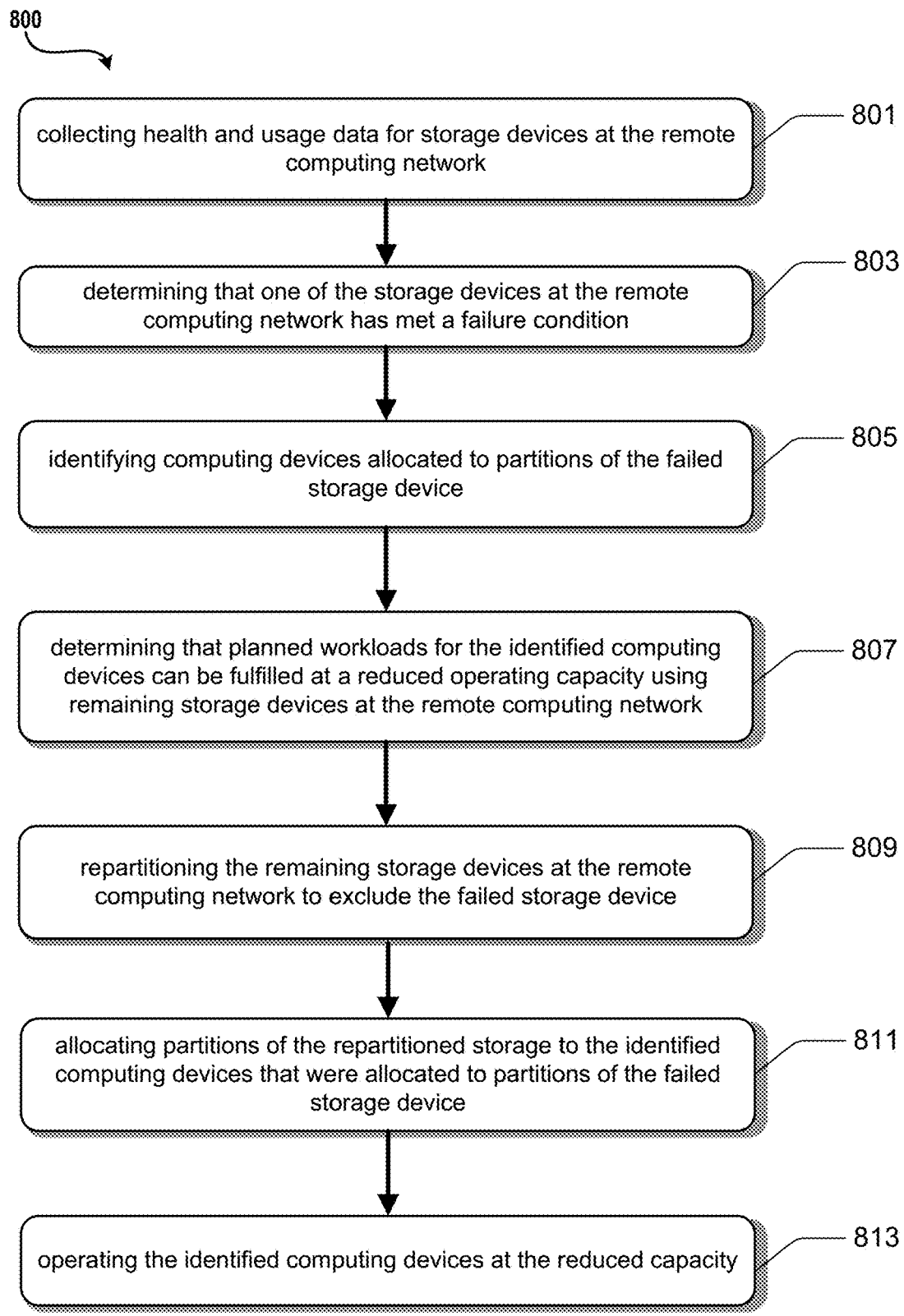
FIG. 8 is a flowchart depicting an example procedure for managing computing resources in accordance with the present disclosure.

Turning now to FIG. 8, illustrated is an example operational procedure for managing computing resources in accordance with the present disclosure. In an embodiment, the computing environment comprises a computing service provider and a remote computing network. In an embodiment, the remote computing network comprises computing and storage devices configured to extend computing resources of the computing service provider to remote users of the computing service provider.

Referring to FIG. 8, operation 801 illustrates collecting health and usage data for storage devices at the remote computing network. In an embodiment, the health and usage data comprises quantity, properties, and performance metrics of the storage devices at the remote computing network. In an embodiment, the storage devices are partitioned and partitions of the storage devices are allocated to computing devices at the remote computing network. Partitioning may generally refer to creation of one or more regions on a storage device that can be allocated or other utilized separately.

Operation 801 may be followed by operation 803. Operation 803 illustrates based on the health data, determining that one of the storage devices at the remote computing network has met a failure condition. The health data may include, for example, various metrics such as availability, read and write latency, test and diagnostic results, and the like. The failure condition may be based on various data such as a discrete failure signal from the storage device, a failed diagnostic test, or based on one or more metrics. For example, a read or write latency that exceeds a threshold value may be indicative of a failure. In some embodiments, the failure condition may be predictive of a hard failure. For example, the storage device may operate, but may have performance issues that indicate that a failure may occur at some time.

Operation 803 may be followed by operation 805. Operation 805 illustrates identifying computing devices allocated to partitions of the failed storage device.

Operation 805 may be followed by operation 807. Operation 807 illustrates based on the usage data, determining that planned workloads for the identified computing devices can be fulfilled at a reduced operating capacity using remaining storage devices at the remote computing network.

Operation 807 may be followed by operation 809. Operation 809 illustrates in response to determining that the planned workloads can be fulfilled at the reduced operating capacity, repartitioning the remaining storage devices at the remote computing network to exclude the failed storage device.

Operation 809 may be followed by operation 811. Operation 811 illustrates allocating partitions of the repartitioned storage to the identified computing devices that were allocated to partitions of the failed storage device.

Operation 811 may be followed by operation 813. Operation 813 illustrates operating the identified computing devices at the reduced capacity.

In an embodiment, a disk monitoring agent is executed at the remote computing network. In an embodiment, the disk monitoring agent is configured to monitor the health and usage data of the storage devices of the remote computing network and send the health and usage data to the computing service provider.

In an embodiment, the disk monitoring agent is configured to maintain data pertaining to availability, read and write latencies, or self-test results.

In an embodiment, a capacity orchestrator at the computing service provider is executed that is configured to determine that the one of the storage devices at the remote computing network has met the failure condition and determine whether the computing device associated with the failed storage device should be marked unhealthy or continue to operate at the reduced capacity.

In an embodiment, repartitioning the remaining storage devices comprises creating or deleting partitions on the storage devices.

In an embodiment:
in response to determining that a healthy storage device has been added at the remote computing environment, the remaining storage devices and the added storage device are repartitioned;
partitions of the remaining storage devices and the added storage device are allocated to the computing devices; and
the computing devices are operated at an increased capacity.

In an embodiment, the planned workloads are deployed across the computing devices of the remote computing network.

In an embodiment, the planned workloads are modified for computing devices of the remote computing network in response to determining that the storage device has failed.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 9:
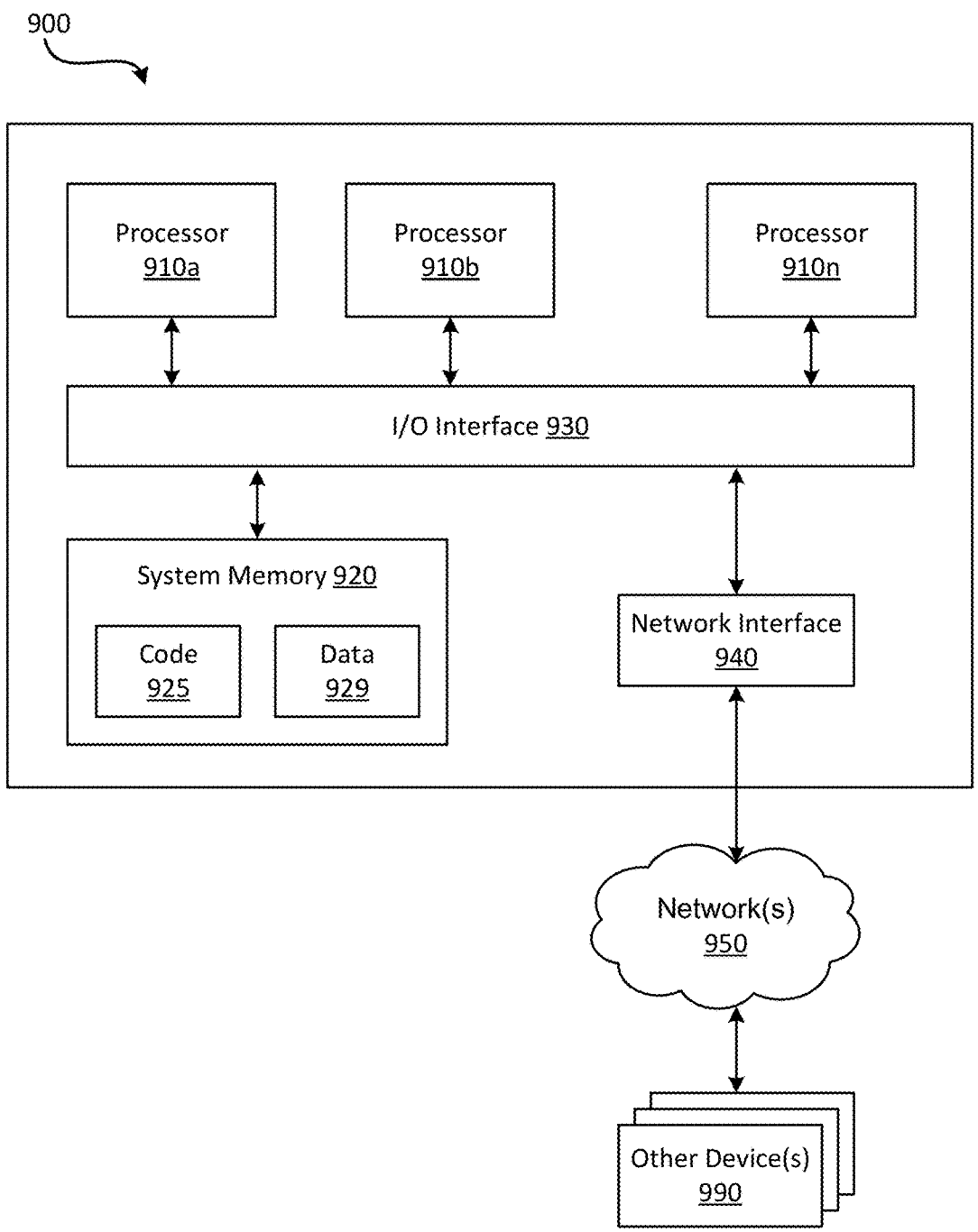
FIG. 9 is an example computing system in accordance with the present disclosure.

FIG. 9 illustrates a general-purpose computing device 900. In the illustrated embodiment, computing device 900 includes one or more processors 910a, 910b, and/or 910n (which may be referred herein singularly as "a processor 910" or in the plural as "the processors 910") coupled to a system memory 920 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x99, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 920 as code 925 and data 929.

In one embodiment, I/O interface 930 may be configured to coordinate I/O traffic between the processor 910, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. Also, in some embodiments some or all of the functionality of I/O interface 930, such as an interface to system memory 920, may be incorporated directly into processor 910.

Network interface 940 may be configured to allow data to be exchanged between computing device 900 and other device or devices 990 attached to a network or network(s) 950, such as other computer systems or devices as illustrated in FIGS. 1 through 5, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 9, may include other components that are not explicitly shown in FIG. 9, or may utilize an architecture completely different than that shown in FIG. 9.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for managing computing resources in a computing environment comprising a computing service provider and a remote computing network, the remote computing network comprising computing and storage devices configured to extend computing resources of the computing service provider to remote users of the computing service provider, wherein the storage devices are partitioned and partitions of the storage devices are allocated to computing devices at the remote computing network, the method comprising:
    determining that one of the storage devices at the remote computing network has met a failure condition;
    identifying computing devices allocated to partitions of the storage device that has met the failure condition;
    determining that planned workloads for the identified computing devices can be fulfilled at a modified operating capacity;
    in response to determining that the planned workloads can be fulfilled at the modified operating capacity, excluding the storage device that has met the failure condition;
    allocating partitions of remaining storage devices at the remote computing network to the identified computing devices; and
    operating the identified computing devices at the modified operating capacity.

2. The method of claim 1, further comprising executing a disk monitoring agent at the remote computing network, the disk monitoring agent configured to monitor health and usage data of the storage devices of the remote computing network and send the health and usage data to the computing service provider, wherein determining that the one of the storage devices at the remote computing network has met a failure condition is based on the health and usage data.

3. The method of claim 2, wherein the disk monitoring agent is configured to maintain data pertaining to availability, read and write latencies, or self-test results.

4. The method of claim 1, further comprising executing a capacity orchestrator at the computing service provider that is configured to determine that the one of the storage devices at the remote computing network has met the failure condition and determine whether the computing device associated with the storage device that has met the failure condition should be marked unhealthy or continue to operate at the modified capacity.

5. The method of claim 1, further comprising repartitioning the remaining storage devices at the remote computing network to exclude the storage device that has met the failure condition, wherein repartitioning the remaining storage devices comprises creating or deleting partitions on the storage devices.

6. The method of claim 1, further comprising:
    in response to determining that a healthy storage device has been added at the remote computing environment, allocating partitions of the remaining storage devices and the added storage device to the computing devices; and
    operating the computing devices at a further modified capacity.

7. The method of claim 1, further comprising:
    deploying the planned workloads across the computing devices of the remote computing network.

8. The method of claim 7, further comprising modifying the planned workloads for computing devices of the remote computing network in response to determining that the storage device has failed.

9. A system comprising:
    one or more hardware processors; and
    a hardware memory in communication with the one or more processors, the hardware memory having computer-readable instructions stored thereupon that, when executed by the one or more hardware processors, cause the system to perform operations comprising:
    determining that one of a plurality of storage devices at a remote computing environment has failed, wherein the remote computing environment is remote from a computing service provider, and wherein the remote computing environment comprises computing and storage devices configured to extend computing resources of the computing service provider to remote users of the computing service provider;
    identifying computing devices allocated to partitions of the failed storage device;
    determining that workloads for the identified computing devices can be fulfilled at a modified operating capacity;
    in response to determining that the workloads can be fulfilled at the modified operating capacity, removing allocations of the failed storage device to the identified computing devices;
    allocating partitions of remaining storage devices at the remote computing environment to the identified computing devices; and
    operating the identified computing devices at the modified capacity.

10. The system of claim 9, further comprising computer-readable instructions stored thereupon that, when executed by the one or more hardware processors, cause the system to perform operations comprising:
    executing a disk monitoring agent at the remote computing environment, the disk monitoring agent configured to monitor health and usage data of the storage devices of the remote computing environment, wherein determining that the one of the storage devices at the remote computing network has failed is based on the health and usage data.

11. The system of claim 10, wherein the disk monitoring agent is configured to maintain data pertaining to one or more of a number of storage devices and their properties, availability, read and write latencies, or self-test results.

12. The system of claim 9, further comprising computer-readable instructions stored thereupon that, when executed by the one or more hardware processors, cause the system to perform operations comprising:
   executing a capacity orchestrator at the computing service provider that is configured to determine that the one of the storage devices has failed and determining whether the computing device associated with the failed storage device should be marked unhealthy or continue to operate at the modified capacity.

13. The system of claim 9, wherein repartitioning the remaining storage devices comprises creating or deleting partitions on the storage devices.

14. The system of claim 9, further comprising computer-readable instructions stored thereupon that, when executed by the one or more hardware processors, cause the system to perform operations comprising:
   in response to determining that a healthy storage device has been added at the remote computing environment, repartitioning the remaining storage devices and the added storage device;
   allocating partitions of the remaining storage devices and the added storage device to the computing devices; and
   operating the computing devices at a further modified capacity.

15. The system of claim 9, further comprising computer-readable instructions stored thereupon that, when executed by the one or more hardware processors, cause the system to perform operations comprising:
   determining capabilities for computing devices of the remote computing environment; and
   based on the capabilities and planned workloads, deploying the planned workloads across the computing devices.

16. The system of claim 15, further comprising computer-readable instructions stored thereupon that, when executed by the one or more hardware processors, cause the system to perform operations comprising:
   modifying the capabilities and planned workloads for computing devices of the remote computing environment in response to determining that the storage device has failed.

17. A computer-readable storage medium having computer-executable instructions stored thereupon which, when executed by one or more processors of a computing device, cause the computing device to:
   determine that one of a plurality of storage devices at a remote computing environment has failed, wherein the remote computing environment is remote from a computing service provider, and wherein the remote computing environment comprises computing and storage devices configured to extend computing resources of the computing service provider to remote users of the computing service provider;
   determine that one of the storage devices at the remote computing environment has failed;
   identify computing devices allocated to the failed storage device;
   determine that workloads for the identified computing devices can be fulfilled at a modified operating capacity;
   in response to determining that the workloads can be fulfilled at the modified operating capacity, remove allocations of the failed storage device to the identified computing devices;
   allocate remaining storage devices at the remote computing environment to the identified computing devices; and
   operate the identified computing devices at the modified capacity.

18. The computer-readable storage medium of claim 17, wherein repartition the remaining storage devices comprises creating or deleting partitions on the storage devices.

19. The computer-readable storage medium of claim 17, further comprising computer-executable instructions stored thereupon which, when executed by one or more processors of a computing device, cause the computing device to:
   in response to determining that a healthy storage device has been added at the remote computing environment, repartition the remaining storage devices to operate at an increased capacity.

20. The computer-readable storage medium of claim 17, further comprising computer-executable instructions stored thereupon which, when executed by one or more processors of a computing device, cause the computing device to:
   enter a request to service the failed storage device to a pool of service requests for the remote computing environment.

* * * * *